(12) United States Patent
Pritikin et al.

(10) Patent No.: US 8,341,250 B2
(45) Date of Patent: Dec. 25, 2012

(54) NETWORKING DEVICE PROVISIONING

(75) Inventors: Max Pritikin, Madison, WI (US); David A. McGrew, Poolesville, MD (US); Jan Vilhuber, Frenchtown, MT (US); Brian E. Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 344 days.

(21) Appl. No.: 12/475,487

(22) Filed: May 30, 2009

(65) Prior Publication Data

US 2010/0306352 A1 Dec. 2, 2010

(51) Int. Cl.
*G06F 15/177* (2006.01)

(52) U.S. Cl. ......... 709/221; 709/219; 709/225; 713/156

(58) Field of Classification Search .......... 709/219, 709/221, 225; 713/156
See application file for complete search history.

(56) References Cited

U.S. PATENT DOCUMENTS

| | | | |
|---|---|---|---|
| 5,835,719 A * | 11/1998 | Gibson et al. | 709/221 |
| 6,847,704 B1 * | 1/2005 | Cherchali et al. | 379/93.05 |
| 6,938,089 B1 * | 8/2005 | Slaby et al. | 709/229 |
| 7,350,227 B2 | 3/2008 | McGrew et al. | |
| 2003/0023849 A1 * | 1/2003 | Martin et al. | 713/176 |
| 2004/0003285 A1 * | 1/2004 | Whelan et al. | 713/201 |
| 2005/0031108 A1 * | 2/2005 | Eshun et al. | 379/201.12 |
| 2005/0138148 A1 * | 6/2005 | Ronen et al. | 709/220 |
| 2005/0149924 A1 * | 7/2005 | Komarla et al. | 717/176 |
| 2006/0174018 A1 * | 8/2006 | Zhu et al. | 709/229 |
| 2006/0184999 A1 | 8/2006 | Guichard et al. | |
| 2006/0242695 A1 | 10/2006 | Nedeltchev et al. | |
| 2008/0046735 A1 | 2/2008 | Nedeltchev et al. | |
| 2008/0222413 A1 | 9/2008 | Vilhuber et al. | |
| 2008/0225749 A1 * | 9/2008 | Peng et al. | 370/254 |
| 2009/0037727 A1 | 2/2009 | Pritikin | |
| 2010/0192212 A1 * | 7/2010 | Raleigh | 726/7 |

* cited by examiner

*Primary Examiner* — Thomas Dailey
(74) *Attorney, Agent, or Firm* — Hickman Palmero Truong Becker Bingham Wong LLP

(57) ABSTRACT

Systems, methods and other embodiments associated with network device provisioning are described. One example method includes storing a set of device specific identification data in a network device. The example method may also include storing an association between the network device and a set of device specific provisioning data. The example method may also include providing the set of device specific provisioning data to the network device. The set of device specific provisioning data may be provided in response to receiving a provisioning data request from the network device.

24 Claims, 6 Drawing Sheets

NETWORKING DEVICE PROVISIONING

BACKGROUND

Companies that manufacture network devices (e.g., routers, switches, bridges, etc.) sometimes may also be tasked with configuring those devices. However, ensuring that a network device has a specific configuration may conventionally require user controlled configuration of a network device. Manufacturing different configurations of network devices with many different configurations may be expensive. On demand manufacture of network devices may also be expensive and introduce delays into the time it takes to ship a network device after a purchase. Further, user configuration of a network device may also be time consuming and expensive.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
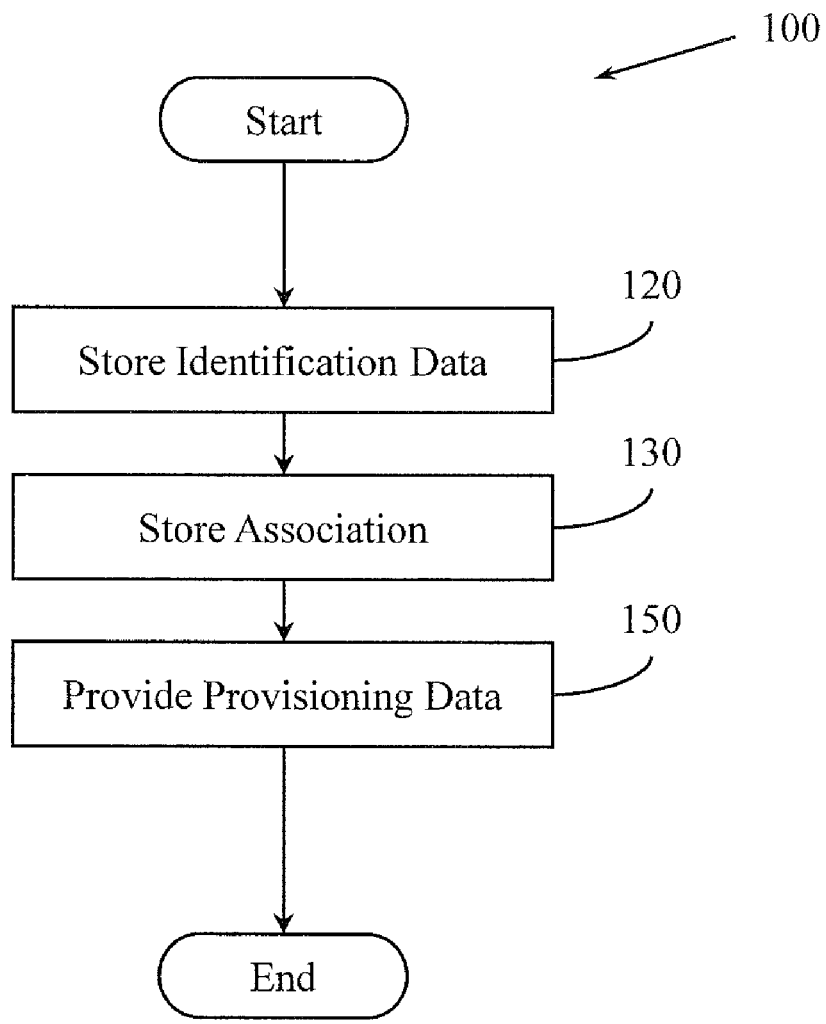
FIG. 1 illustrates an example method associated with network device provisioning.

Systems and methods associated with network device provisioning are described. Example systems and methods provide devices with configurations. Example systems and methods automatically and securely provision a secure network in which devices are given a configuration that lets it know what other devices it should trust, and the locations of those trustworthy devices on a network. Conventionally this has been difficult, if possible at all, because a configuration must be authenticated. Authenticating the configuration means that its authenticity and integrity are to be protected against alteration.

One example method includes storing a set of device specific identification data in a network device. The method also includes storing on the network device a public key certificate or other credential that can be used by the device to authenticate a provisioning service. The method also includes providing the network device with a way to locate or discover the provisioning service. One technique for locating a provisioning service is to have the device store a Domain Name System (DNS) name or an Internet Protocol (IP) address. One technique for discovering a provision service is to store a DNS service location (SRV) record. A DNS SRV record is similar to a DNS name, except that it allows a local DNS server to point to a local server that provides the provisioning service. In this technique, a device can send a message towards the provisioning service. The message may be handled locally by a provisioning service or it may travel all the way back to the vendor provisioning service. Regardless of whether the message is handled locally or travels back, the response can be authenticated by the device.

The method also includes storing an association between the network device and a set of device specific provisioning data. In some embodiments, the device specific provisioning data may be thought of as a provisioning tracking record. The method also includes providing the set of device specific provisioning data to the network device in response to a signal received from the device. In one example the signal may include a portion of the set of device specific identification data. This may facilitate authenticating the original device so that the set of device specific provisioning data associated with the device may be determined and provided to the device. Provisioning a device remotely after the device has been installed may reduce the amount of manual customization of the device. In one embodiment, when a device is sold to a customer, the vendor may store information concerning the purchaser of the device. This information can then be provided to the provisioning service to construct appropriate configuration information to be provisioned on a particular device. One skilled in the art will appreciate that provisioning data provided to a device can include pre-computed information, information that is computed just in time for delivery to the device, and so on. One skilled in the art will appreciate that different provisioning data may be provided in different embodiments. Thus, a provisioning service may use a public key certificate or other credential information to perform actions including, examining policy, examining details in a database, and so on, to determine an appropriate provisioning data for a specific device.

Some systems and methods may facilitate provisioning a newly activated network device with software configured specifically for the network device. Provisioning the network device may occur automatically the first time the network device becomes active in a network as the network device may contact the provisioning server and download device specific data without user input. Thus, manual configuration of a device may not be required, reducing device cost and/or setup time. In another example, a device may acquire trusted public key information from a provisioning server, and the identities of devices that are to be trusted to act in a certain role. The trusted public key information can then be used to validate an address. This may allow the device to contact devices (e.g., a virtual private network hub) associated with the trusted public information. For example, an organization may require that routers installed at franchise locations be able to securely connect to a corporate network. Instead of sending an administrator to individual locations, the organization may make use of a provisioning server that automatically configures purchased routers that are sent to individual locations and connected to the network by an untrained local employee.

Network device vendors may issue a unique serial number (SN) for a device that it sells. A device stores its own SN. The SN can be used to identify and track that device. A vendor may also provide a secure serial number, also known as a Secure Device Identifier (DevID), by providing a device with data that it can use to authenticate its identity as the holder of a particular SN. The DevID may include a public key certificate that has the SN as its subject, and a public/private key pair, with the public key in the certificate and the private key held within the device associated with the identifier. The private key may be kept secret by the device. The certificate is signed by a certificate authority that is associated with the vendor. The vendor may make the public key of its certificate authority publicly available so that it can be verified that the certificate in the SecDevID was actually issued by the vendor. After the device uses its private key to sign a message, it is possible to use the public key in the certificate in the SecDevID data to verify that the message was signed by the device with the DevID.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a method 100 associated with network device provisioning. Method 100 includes, at 120, storing a set of device specific identification data in a network device. The device specific identification data may be stored in a network device during the process of manufacturing the network device. This facilitates having the device authenticate itself to a provisioning service so that the service can provide the device with provisioning data that is appropriate to the particular device. The device appropriate provisioning data may be provided over a cryptographically secure channel. In one example, the set of device specific identification data may comprise a digital certificate, a serial number, a DevID, an identification number, and so forth. An identification number may be a media access control (MAC) address, a behavior configuration number, and so forth. Thus, the set of device specific identification data may facilitate performing device specific configurations for the network device at a later point and may reduce the number of unique device configurations that a network device manufacturer supports.

Method 100 also includes, at 130, storing an association between the network device and a set of device specific provisioning data. The device specific provisioning data may be considered to be a form of a "provisioning tracking record." The data may include, or be indexed by, some information that identifies the device. The data may include, for example, public key information a distributed/remote provisioning service that may be expected to ultimately service requests for provisioning information. In one example, the set of device specific provisioning data may comprise a set of instructions that, when executed by the network device, cause the network device to perform a behavior. The behavior may include, for example, controlling a device to trust a particular other device to act in a particular role (e.g., trusted certificate authority, IPSec peer, management station), how to handle a protocol, security settings, data recording and/or analysis, quality of service management, and so forth. Thus, the set of device specific provisioning data may contain software that controls the network device to process and/or respond to incoming communications in a non-default manner. In another example, the set of device specific provisioning data may comprise a set of trusted public information. The trusted public information may facilitate establishing a secure connection between the network device and a device associated with the trusted public information. A device associated with the trusted public information may be, for example, a certificate enrollment protocol registration authority, a certificate authority a virtual private network (VPN) hub, a VPN member, a group domain of interpretation (GDOI) server, a customer network management station, and so forth.

Method 100 also includes, at 150, providing the device specific provisioning data to the network device. Recall that the device specific provisioning data may, in some cases, be thought of as a provisioning tracking record. The set of device specific provisioning data may be provided in response to receiving a provisioning data request from the network device. The provisioning data request may facilitate authenticating the network device with a portion of the set of device specific identification data. The device may also use key material (e.g., public key certificate, credential) to authenticate a provisioning service. Thus, method 100 illustrates how device specific configurations may be automatically installed into unique network devices without manufacturing the specific configurations into new devices on demand. This may reduce costs of a network device manufacturer, while still allowing the manufacturer to provide high quality customizable services to clients with a variety of requirements.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

While FIG. 1 illustrates various actions occurring in serial, it is to be appreciated that various actions illustrated in FIG. 1 could occur substantially in parallel. By way of illustration, a first process could store identification data, a second process could store an association between the identification data and a set of provisioning data, and a third process could provide the provisioning data to the network device. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a tangible media may store computer executable instructions that if executed by a machine (e.g., processor) cause the machine to perform a method. While executable instructions associated with the above method are described as being stored on a tangible media, it is to be appreciated that executable instructions associated with other example methods described herein may also be stored on a tangible media.

A "tangible media", as used herein, refers to a medium that stores signals, instructions and/or data. A tangible media may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a tangible media may include, but are not limited to, a floppy disk, a flexible disk, a hard disk, a magnetic tape, other magnetic medium, an application specific integrated circuit (ASIC), a compact disk CD, other optical medium, a random access memory (RAM), a read only memory (ROM), a memory chip or card, a memory stick, and other media from which a computer, a processor or other electronic device can read.

"Signal", as used herein, includes but is not limited to, electrical signals, optical signals, analog signals, digital signals, data, computer instructions, processor instructions, messages, a bit, a bit stream, or other means that can be received, transmitted and/or detected.

Figure 2:
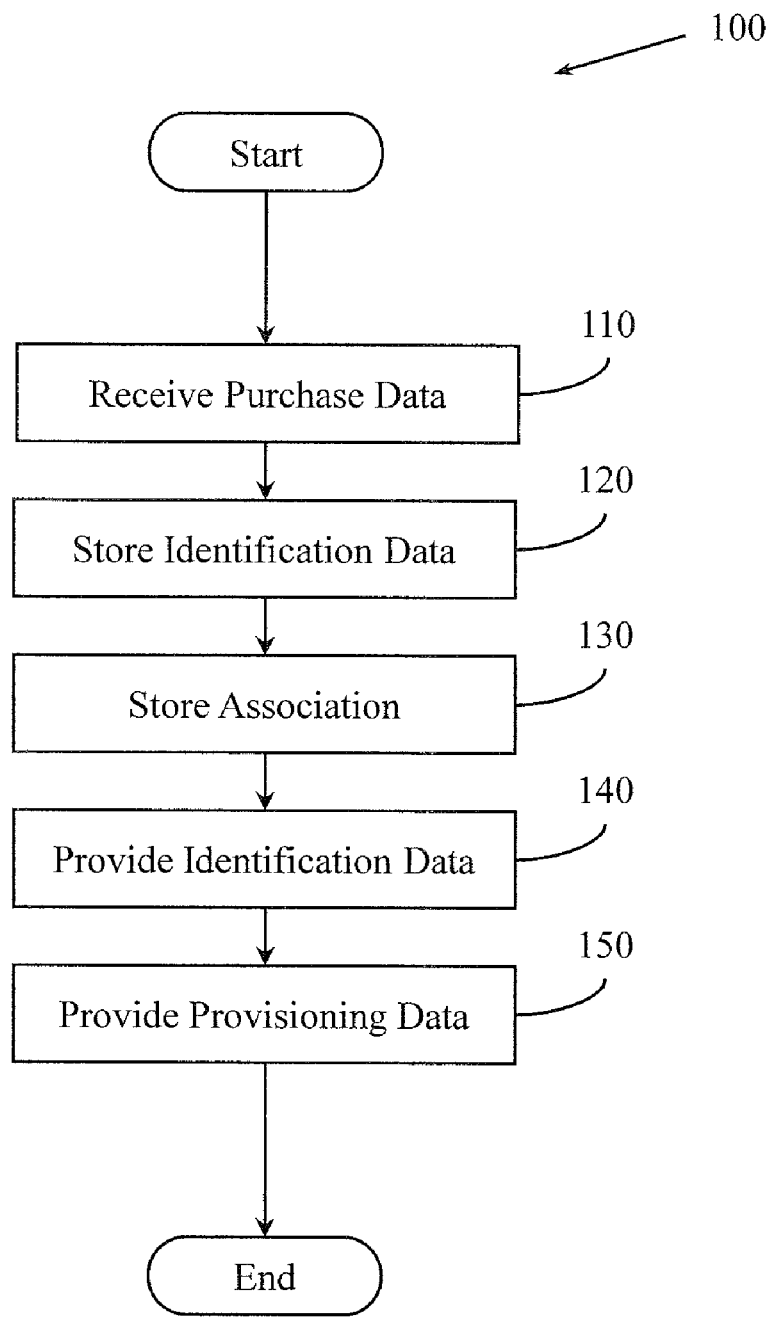
FIG. 2 illustrates an example method associated with network device provisioning.

FIG. 2 illustrates another embodiment of method 100. This embodiment of method 100 includes, at 110, receiving a set of purchase data. The purchase data may be provided in, for example, a purchase order. The set of purchase data may be associated with the set of device specific provisioning data. In one example, the set of purchase data may identify software to be included in the set of device specific provisioning data. In another example, the purchase data may identify the customer that purchased the device. In another example, the purchase data may contain data provided by the customer, such as information about the intended role or use of the device, or location to which it will be shipped. In another example, the set of purchase data may identify a configuration to be included in the set of device specific provisioning data. While two examples are described, a person having ordinary skill in the art can see how other types of data may be identified by the set of purchase data for inclusion in the set of device specific provisioning data. The embodiment of method 100 in FIG. 2 also includes, at 140, providing a portion of the set of device specific identification data to a purchaser associated with the set of purchase data. The purchaser may be identified in the purchase order. This may allow the purchaser to pre-configure a network to automatically accept a connection from the network device when the network device is activated. Thus, this embodiment of method 100 illustrates how, after a purchase, a network device may be configured to automatically acquire device specific configurations dictated by the purchase.

Figure 3:
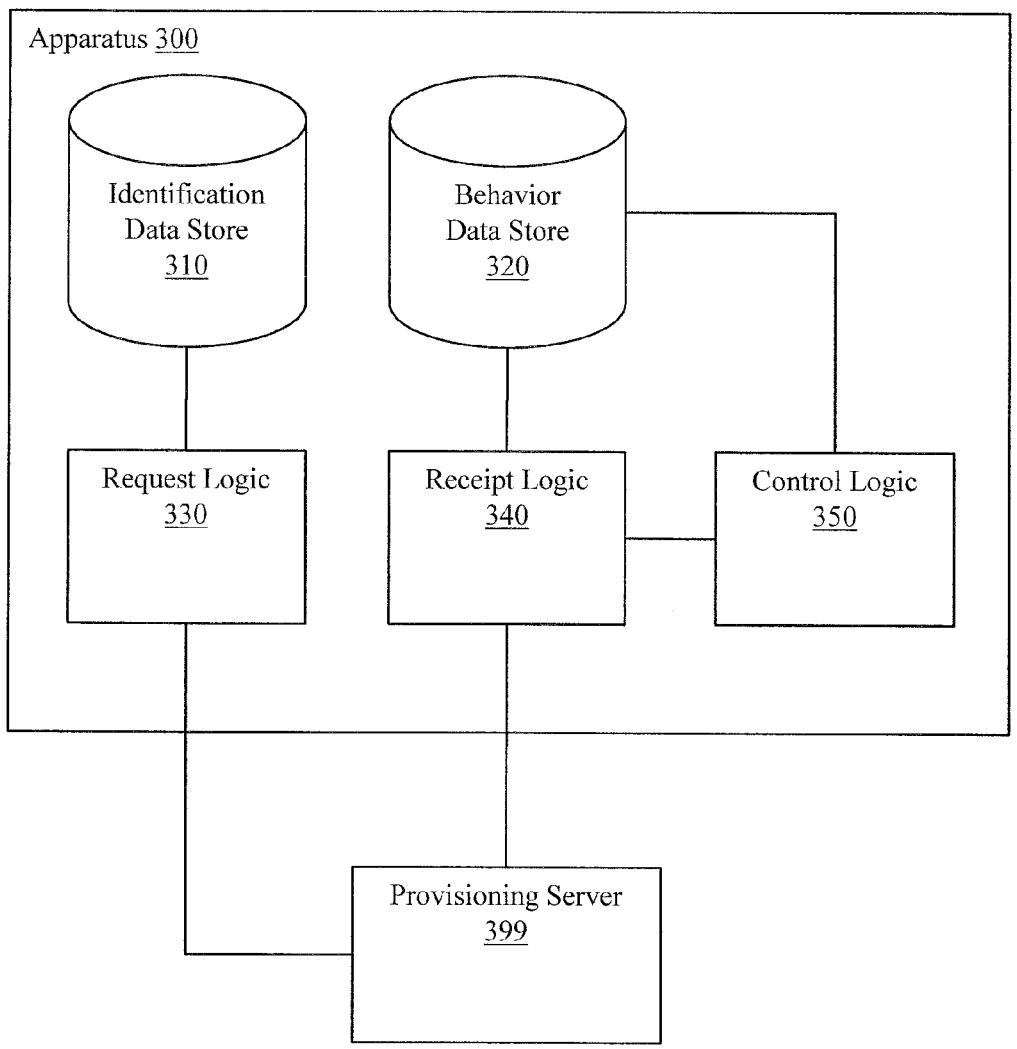
FIG. 3 illustrates an example apparatus associated with network device provisioning.

FIG. 3 illustrates an apparatus 300 associated with network device provisioning. Apparatus 300 includes an identification data store 310 to store a set of device identification data. As described above, the set of device identification data may comprise a digital certificate, a unique device identifier, an identification number, and so forth. Apparatus 300 also includes a behavior data store 320 to store behavior data comprising a set of default behavior data. The set of behavior data may comprise a set of instructions, a set of trusted public information (e.g., key information, discovery information, DNS name), and so forth. Trusted public information may facilitate establishing a secure connection between the apparatus 300 and a device associated with the trusted public information. Apparatus 300 also includes a request logic 330. Request logic 330 may provide a behavior data request to a provisioning server 399. The behavior data request may comprise a portion of the set of device identification data. In one example, the provisioning server may be configured to authenticate the apparatus 300 based on a portion of the set of device identification data.

Apparatus 300 also includes a receipt logic 340. Receipt logic 340 may receive a behavior signal from the provisioning server 399. The behavior signal may identify one of, the set of default behavior data, and a set of updated behavior data. Thus, the behavior signal tells apparatus 300 whether updated behavior data is available. When the behavior signal identifies the set of updated behavior data, receipt logic 340 may also store the set of updated behavior data in behavior data store 320. In one example, the set of updated behavior data may be contained in the behavior signal when the behavior signal identifies the set of updated behavior data. However, a person having ordinary skill in the art can see how the behavior signal may contain a location from which receipt logic 340 may fetch the set of updated behavior data, an instruction to fetch the set of updated behavior data from a preconfigured location, and so forth. Apparatus 300 also includes a control logic 350. Control logic 350 may initiate a behavior based on the behavior signal and/or a set of behavior data in the behavior store. The behavior may involve, for example, quality of service management, security protocols, data analysis, and so forth.

In one example, the apparatus illustrated in FIG. 3 may be a network device (e.g., a router, a bridge, a switch, and so forth). The network device may be configured to acquire the network device's specific behaviors after the network device has been integrated into a network. This may allow a manufacturer of network devices to have a configurable model and a non-configurable model instead of models with several configurations and/or a built to order operation. Thus, a configurable network device may automatically acquire configurations and settings requested at a time of purchase without receiving manual configuration from the purchaser and/or the manufacturer.

Figure 4:
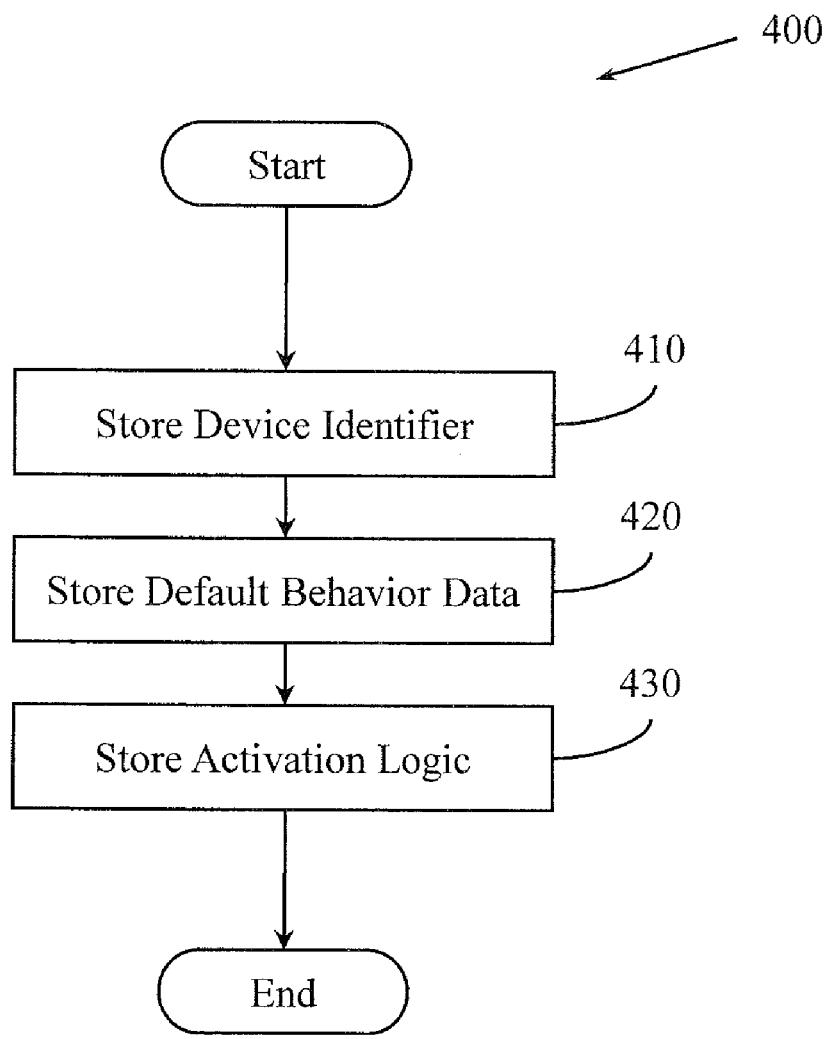
FIG. 4 illustrates an example method associated with network device provisioning.

FIG. 4 illustrates a method 400 associated with network device provisioning. Method 400 includes, at 410, storing a unique device identifier in a router. As described above, the unique device identifier may be one or more of, a digital certificate, a unique device identifier, an identification number, and so forth. Method 400 also includes, at 420, storing a set of default behavior data in the router. A set of behavior data may comprise a set of instructions, a set of trusted public information, and so forth. As above, the trusted public information may facilitate establishing a secure connection with a device associated with the trusted public information.

Method 400 also includes, at 430, storing an activation logic in the router. The activation logic may be a zero-touch logic. A zero-touch logic is a logic that does not require input to function beyond typical initial setup of the router. For example, the zero-touch logic may be able to initiate as soon as the router detects that conditions for normal operation have been achieved. Some routers may detect that conditions for normal operation have been achieved upon detecting a power source and a network connection. Detecting conditions for normal operation may also include detecting an activation of the device (e.g., state change of a power switch on the router). However, a logic requiring an external input to specifically activate the logic (e.g., a user originated signal) would not be a zero-touch logic.

The activation logic may be configured to provide a behavior data request to a provisioning server upon detecting an initial activation of the router in a network. The behavior data request may comprise the unique device identifier. The provisioning server may be configured to authenticate the router based on the unique device identifier. The activation logic may also be configured to receive a behavior signal from the provisioning server. The behavior signal may identify the set of default behavior data or a set of updated behavior data. When the behavior signal identifies the set of default behavior data, the activation logic may control the router to initiate a default behavior. The default behavior may be based on the set of default behavior data. The default behavior may include instructions for performing basic routing and provide a limited amount of user control over the router. When the behavior signal identifies the set of updated behavior data, the activation logic may control the router to store the set of updated behavior data in the router and initiate an updated behavior. The updated behavior may be based on the set of updated behavior data. As described above, the updated behavior may facilitate stronger security, quality of service management, data collection and/or analysis, greater control over router settings, and so forth.

Figure 5:
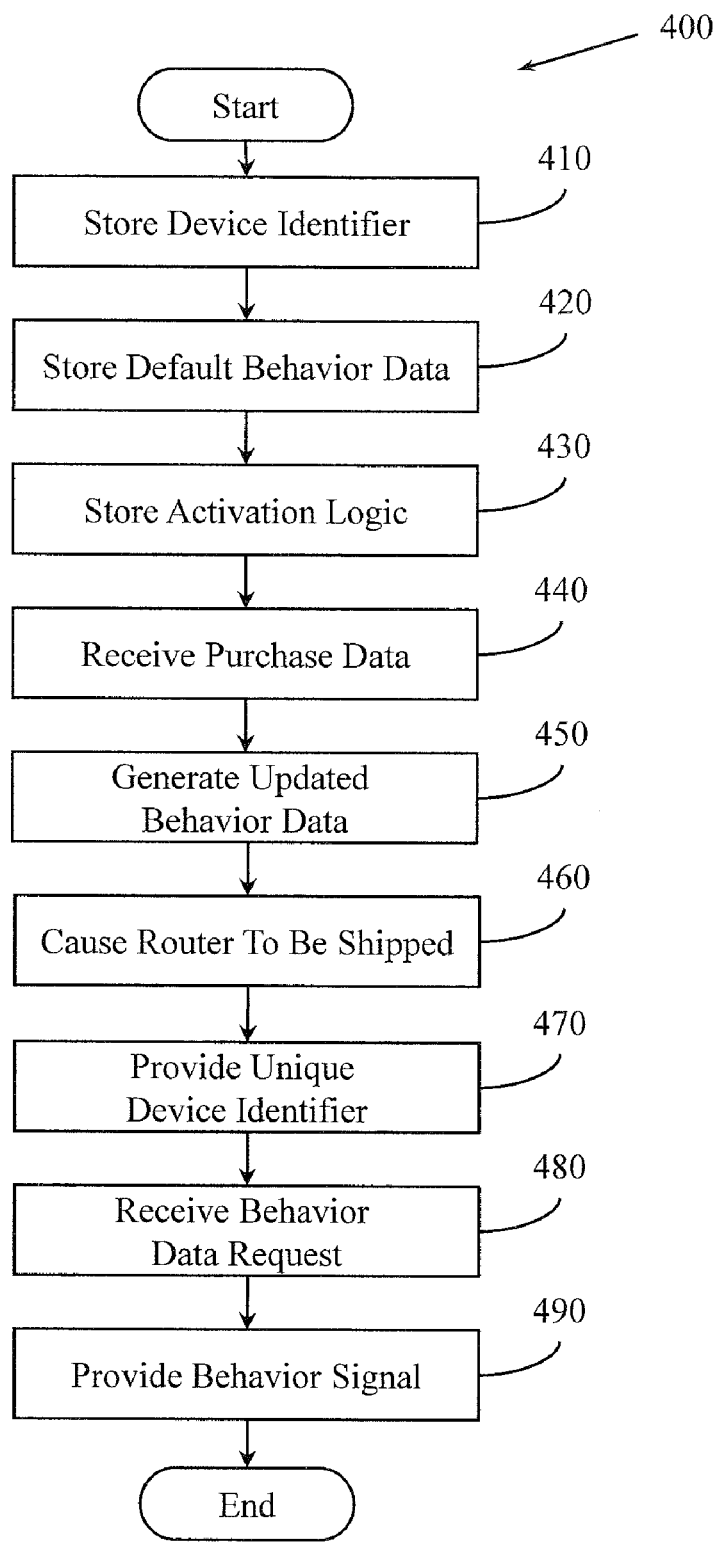
FIG. 5 illustrates an example method associated with network device provisioning.

FIG. 5 illustrates another embodiment of method 400. This embodiment of method 400 includes, at 440, receiving a set of purchase data. The set of purchase data may be received in the form of a purchase order. The set of purchase data may control whether the behavior signal identifies the set of default behavior data or the set of updated behavior data. This embodiment of method 400 also includes, at 450, generating a set of updated behavior data. The set of updated behavior data may be generated based on the set of purchase data upon determining that the set of purchase data is configured to control the behavior signal to identify the set of updated behavior data.

The embodiment of method 400 illustrated in FIG. 5 also includes, at 460 causing the router to be shipped to a location identified by the set of purchase data. This embodiment of method 400 also includes, at 470, providing the unique device identifier to a purchaser identified by the set of purchase data. This may allow the purchaser to configure a network to automatically integrate the router when it is connected to the network. Further, this may allow an employee of, for example, a chain store, who may not be particularly technologically knowledgeable, to simply connect a few cables to a router, and have the router automatically connect to a corporate network. This embodiment of method 400 also includes, at 480, receiving a behavior data request from the router, and at 490, providing a behavior signal to the router. Thus, the embodiment of method 400 illustrated in FIG. 5 may describe the process of configuring a router over the course of the manufacture of the router. At first, a default router may be constructed that performs basic routing functionalities, and at a later point the router may acquire configurations purchased by an owner of the router automatically from a provisioning server.

By way of illustration, a router manufacturer may have different types of clients. The router manufacturer may sell routers to an organization that has many small locations throughout a country as well as to a financial firm that has large offices in a small number of major cities. When the financial firm purchases a new router, the firm may request that a large number of specialized logics be installed in the new router. When the organization opens a new location, the company may not require specialized logics, but may require that a router installed in the new location be able to securely connect to a corporate network controlled by the organization. To ensure that routers that are purchased are configured with the proper settings, the manufacturer may implement an embodiment of method 400 to configure the routers. Thus, method 400 may allow a router purchased by the organization to be provisioned a first way on activation, and a router purchased by the financial firm may be provisioned an alternate way.

Figure 6:
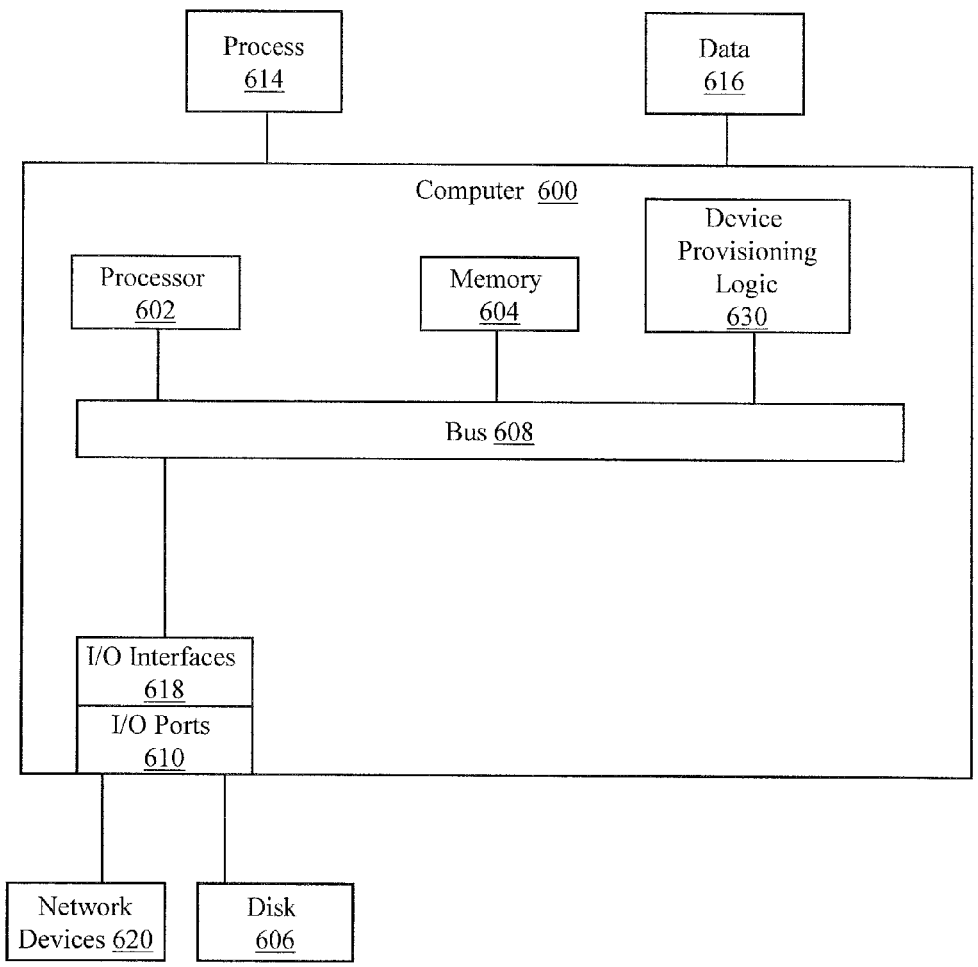
FIG. 6 illustrates an example computing environment in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a device provision logic 630 configured to facilitate configuring a network device. In different examples, the logic 630 may be implemented in hardware, software, firmware, and/or combinations thereof. While the logic 630 is illustrated as a hardware component attached to the bus 608, it is to be appreciated that in one example, the logic 630 could be implemented in the processor 602.

Thus, logic 630 may provide means (e.g., hardware, software, firmware) for storing a set of device specific identification data in a network device. Logic 630 may also provide means (e.g., hardware, software, firmware) for storing a set of default behavior data in the network device. Logic 630 may also provide means (e.g., hardware, software, firmware) for selectively providing the network device a set of updated behavior data upon authenticating the network device. The network device may be authenticated based on a behavior data request comprising the set of device specific identification data. The means associated with logic 630 may be implemented, for example, as an ASIC. The means may also be implemented as computer executable instructions that are presented to computer 600 as data 616 that are temporarily stored in memory 604 and then executed by processor 602.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM drive, a Blu-Ray drive, an HD-DVD drive, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, MB, AABB, AABBC, AABBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A logic encoded in one or more non-transitory tangible media for execution and when executed operable to perform a method, the method comprising:

storing, in a router, a set of device specific identification data;

a provisioning server storing an association between the router and a set of device specific provisioning data;

where the set of device specific provisioning data comprises a set of trusted public information that facilitates establishing a secure connection between the router and a device associated with the trusted public information;

where the device associated with the trusted public information is in a network in which the router is to be installed and that does not contain the provisioning server;

where a device associated with the trusted public information is any of, a certificate enrollment protocol registration authority, a virtual private network (VPN) hub, a VPN peer, and a group domain of interpretation (GDOI) server;

configuring the router to locate the provisioning server;

configuring the router to authenticate the provisioning server;

configuring the provisioning server to provide the set of device specific provisioning data to the router in response to receiving a provisioning data request from the router, where the provisioning data request facilitates authenticating the router with a portion of the set of device specific identification data, and to provide the set of trusted public information to the router after the router authenticates to the provisioning server.

2. The logic of claim 1, where the set of device specific identification data comprises a digital certificate.

3. The logic of claim 1, where the set of device specific identification data comprises one or more of, a unique device identifier (UDI), and a public key certificate.

4. The logic of claim 1, where the set of device specific identification data comprises an identification number.

5. The logic of claim 4, where the identification number is one of, a media access control (MAC) address, and a behavior configuration number.

6. The logic of claim 1, where the set of device specific provisioning data comprises a set of instructions that, when executed, cause the router to perform a behavior.

7. The logic of claim 1, the method comprising receiving a set of purchase data, where the purchase data is associated with the set of device specific provisioning data.

8. The logic of claim 1, where the set of device specific identification data is stored in the router during the manufacture of the router.

9. The logic of claim 7, comprising providing a portion of the set of device specific identification data to a purchaser associated with the set of purchase data.

10. The logic of claim 7, the method comprising:
causing the router to be shipped to a location identified by the set of purchase data.

11. The logic of claim 1, where configuring the router to locate the provisioning server comprises providing the router with one of, a DNS name of the provisioning server, and IP address of the provisioning server.

12. The logic of claim 1, where configuring the router to authenticate the provisioning server comprises configuring the router to process a trusted public credential of the provisioning server.

13. A method comprising:
storing, in a router, a set of device specific identification data;
a provisioning server storing an association between the router and a set of device specific provisioning data;

where the device specific provisioning data comprises a set of trusted public information that facilitates establishing a secure connection between the router and a device associated with the trusted public information;

where the device associated with the trusted public information is in a network in which the router is to be installed and that does not contain the provisioning server;

where a device associated with the trusted public information is any of, a certificate enrollment protocol registration authority, a virtual private network (VPN) hub, a VPN peer, and a group domain of interpretation (GDOI) server;

configuring the router to locate the provisioning server;

configuring the router to authenticate the provisioning server;

configuring the provisioning server to provide the set of device specific provisioning data to the router in response to receiving a provisioning data request from the router, where the provisioning data request facilitates authenticating the router with a portion of the set of device specific identification data, and to provide the set of trusted public information to the router after the router authenticates to the provisioning server.

14. The method of claim 13, where the set of device specific identification data comprises a digital certificate.

15. The method of claim 13, where the set of device specific identification data comprises one or more of, a unique device identifier (UDI), and a public key certificate.

16. The method of claim 13, where the set of device specific identification data comprises an identification number.

17. The method of claim 16, where the identification number is one of, a media access control (MAC) address, and a behavior configuration number.

18. The method of claim 13, where the set of device specific provisioning data comprises a set of instructions that, when executed, cause the router to perform a behavior.

19. The method of claim 13, further comprising receiving a set of purchase data, where the purchase data is associated with the set of device specific provisioning data.

20. The method of claim 13, where the set of device specific identification data is stored in the router during the manufacture of the router.

21. The method of claim 19, comprising providing a portion of the set of device specific identification data to a purchaser associated with the set of purchase data.

22. The method of claim 19, further comprising causing the router to be shipped to a location identified by the set of purchase data.

23. The method of claim 13, where configuring the router to locate the provisioning server comprises providing the router with one of, a DNS name of the provisioning server, and IP address of the provisioning server.

24. The method of claim 13, where configuring the router to authenticate the provisioning server comprises configuring the router to process a trusted public credential of the provisioning server.

* * * * *